United States Patent Office 3,196,249
Patented July 20, 1965

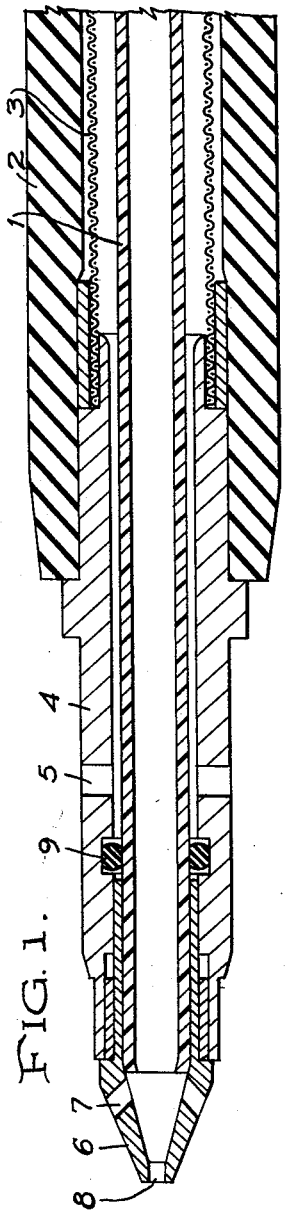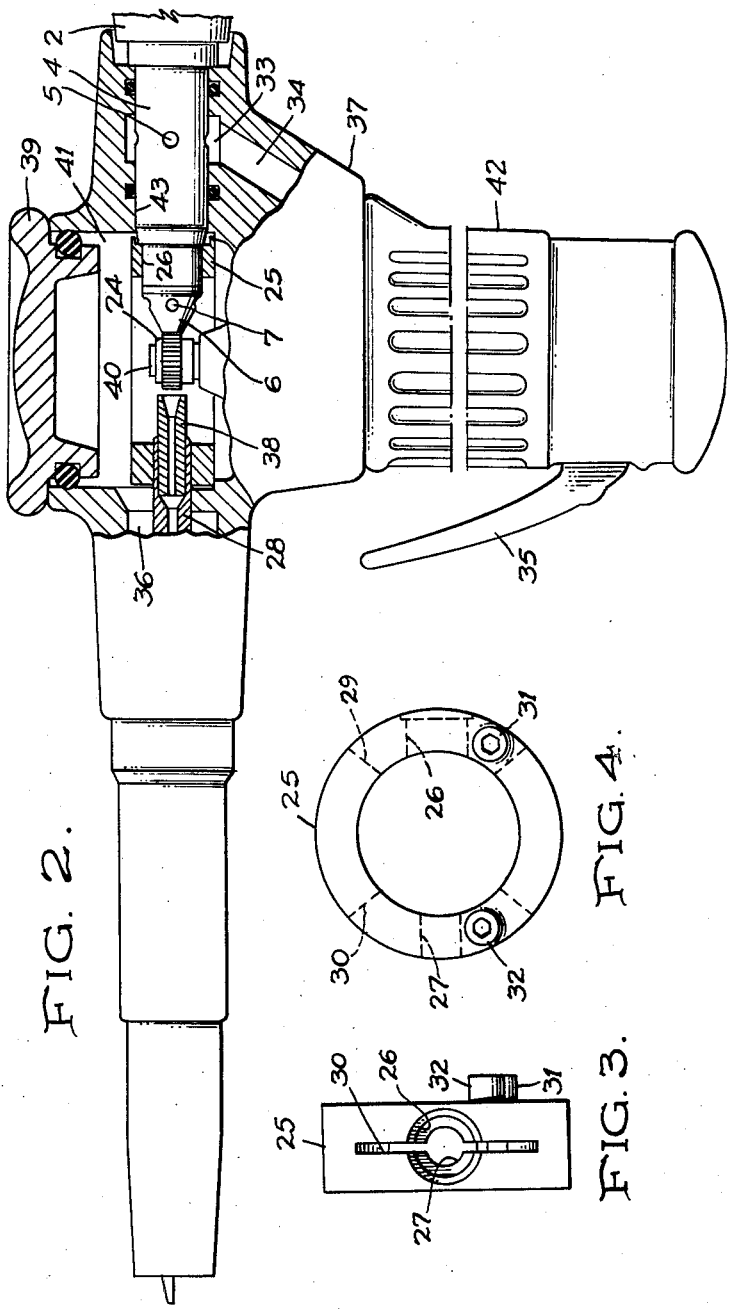

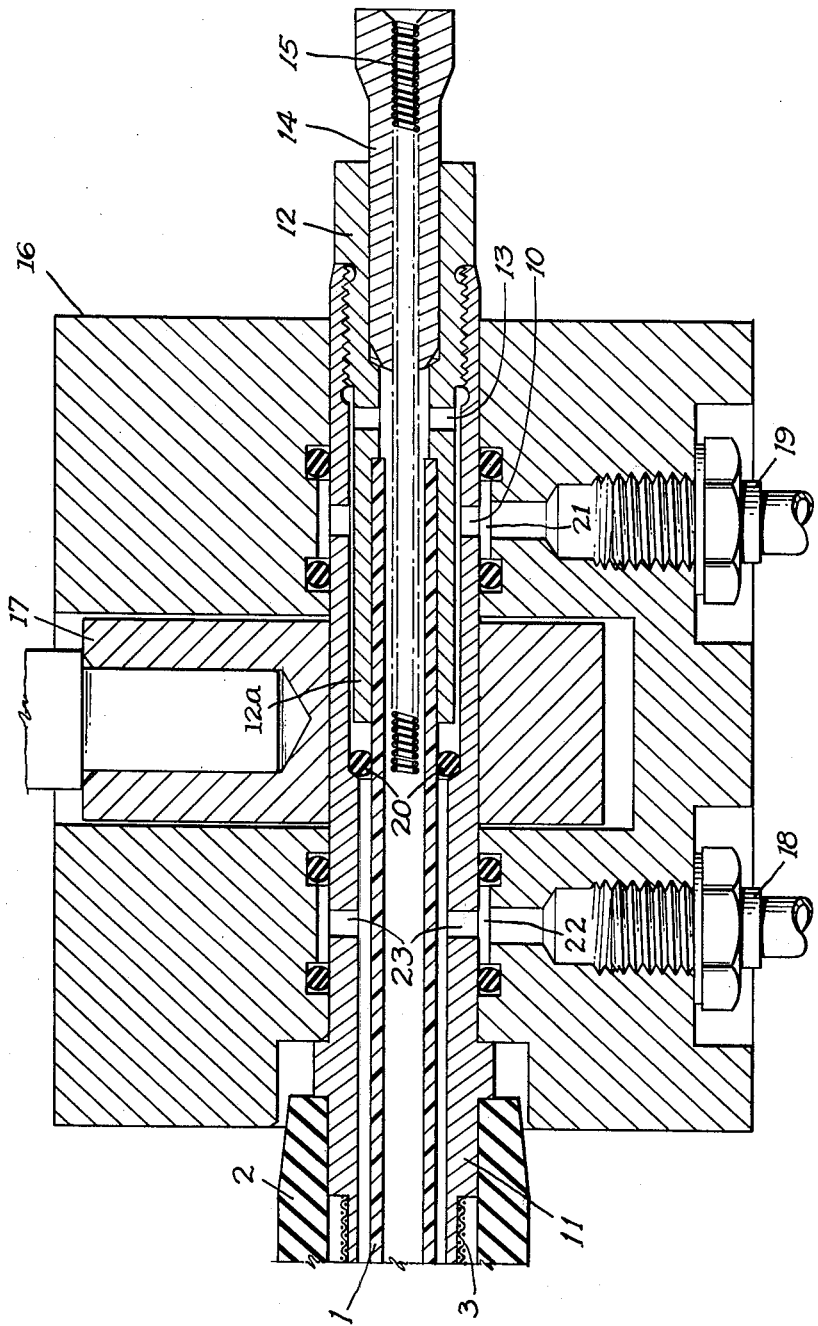

3,196,249
APPARATUS FOR GAS-SHIELDED CONSUMABLE-ELECTRODE ARC WELDING
Harry Thostrup, Laxa, Sweden, assignor to Elektriska Svetsningsaktiebolaget, Goteborg, Sweden, a corporation of Sweden
Filed Mar. 9, 1964, Ser. No. 350,318
Claims priority, application Sweden, Mar. 12, 1963, 2,679/63
6 Claims. (Cl. 219—130)

The present invention relates to apparatus for gas-shielded consumable-electrode arc welding. More particularly, the invention relates to apparatus of the kind comprising a welding gun and flexible means for the conveyance to the welding gun of all of the working media required for the operation of the welding gun, said flexible means including a flexible welding current cable, a flexible guide for the wire electrode, a flexible conduit for the shielding gas, and flexible conduits for any other fluids which may be required for operating the welding gun. If, for instance, the welding gun is of the water-cooled type, the flexible means will have to include flexible cooling water conduits, and if the welding gun is equipped with a compressed-air driven motor for advancing the wire, the flexible means will have to include a flexible conduit for the compressed air.

To carry out repairs and maintenance work on the gun it is not infrequently necessary to detach the gun entirely from the several flexible means above referred to. The flexible means themselves also sometimes demand repairs; for instance, it will sometimes be necessary to replace a faulty or worn-out wire guide by a new one. In the apparatus heretofore used, such operations are comparatively time-consuming and require the use of special tools.

It is an object of the present invention to provide improved apparatus in which the welding gun is easily and quickly detachable from or attachable to the flexible means required for the supply of the various working media thereto. Another object is the provision of improved apparatus of the kind referred to in which all of the flexible means can be readily detached as a unit from the rest of the apparatus. A still further object is the provision of apparatus of the kind referred to in which the flexible means are attached to the welding gun through an improved connector common to all of said flexible means. Another object is the provision of apparatus in which the flexible means are provided with a similar, common connector also at their rear extremity (that is, the extremity remote from the welding gun).

According to a principal feature of the invention, the improved apparatus comprises a plug-and-socket connector adapted to connect all of the flexible means to the welding gun.

According to a further feature of the invention, the rear part of the welding gun itself forms the socket member of the connector.

The invention also includes apparatus in which a second plug-and-socket connector is adapted to convey the various working media to the flexible means at the end remote from the welding gun, whereby the flexible means and the connector members attached to each end of said flexible means form an easily detachable unit.

The invention further includes apparatus in which a welding current carrying member forming part of the plug member of the connector is adapted to be gripped by a contact clamp provided in the socket member of the connector, whereby not only an adequate contact pressure is secured for the transmission of the welding current but also the connector members are securely held together.

Other objects and features of the invention will be clear from the following description, by way of example, of an embodiment of the invention with reference to the accompanying drawings, in which:

FIG. 1 is a sectional view of a connector plug attached to the anterior end of composite hose and welding current cable;

FIG. 2 is a side elevation, partly in section, of a welding gun the rear part of which forms a socket for the connector plug of FIG. 1;

FIGS. 3 and 4 show two elevations, at right angles to each other, of a part of the welding gun which serves as a contact clamp gripping the connector plug;

FIG. 5 is a sectional view of a connector plug attached to the rear end of the composite hose and welding current cable, and a connector socket engaging said connector plug.

FIGS. 1 and 5 are drawn to the same scale, while FIGS. 2 to 4 are drawn to a smaller scale.

The composite hose and welding cable shown in FIG. 1 comprises an outer hose 2, which may for instance consist of reinforced rubber, a inner hose 1, and a hose-shaped, plaited welding current cable 3 disposed in the space between the hoses 1 and 2. The hose 1 may, for instance, consist of some suitable plastic such as a polyamide or polytetrafluorethylene. The space between the hoses serves as a conduit for compressed air. The compressed air is required as a driving agent for a compressed air motor provided in the welding gun, and also serves as a cooling agent for cooling the welding cable 3. The inner hose 1 serves as a conduit for shielding gas and also as a guide for the welding wire (not shown).

The connector plug comprises a metal sleeve 4 the rear end of which is permanently joined to the outer hose 2 and to the welding current cable 3. A conical nipple 6 is mounted on the front end of the sleeve. The inner diameter of the sleeve exceeds the outer diameter of the inner hose 1, which reaches to the nipple 6. The space thus provided between the anterior portion of the hose 1 and the sleeve is closed at its anterior end by annular sealing member 9 and communicates at its rear end with the compressed air conduit formed between the hoses 1 and 2. The sleeve is provided with radial outlet holes 5 for the compressed air. The conical nipple 6 is provided with a central opening 8 for the welding wire and with laterial outlet openings 7 for the shielding gas. In FIG. 2, the connector plug is shown in position in a welding gun. The welding gun has a body or housing 37 consisting of electrically insulating material, for instance a thermoplastic material. The rear part of the pistol body, which is adapted to serve as a socket member co-operating with the plug member of the connector, is provided with a cylindrical hole or bore 43 extending forwards to a chamber 41 covered by a gas-tight lid 39. The bore 43 receives the sleeve 4 of the plug member, the tip of which extends into the chamber 41, so that the welding wire and the shielding gas emerge into said chamber through the holes 7, 8 at the tip of the plug member. The handle 42 of the gun forms the outer cover of a compressed-air motor with suitable reduction gear adapted to drive an axle 40 extending into the chamber 41 and supporting a wire advancing roll 24 cooperating with a similar, spring-pressed backing roll (not shown). An annular metal member 25 (shown in detail in FIGS. 3 and 4) fitted into the chamber 41 is provided with a rear bore 26 engaging a portion of the sleeve 4 of the plug member and with a front bore 27 having the same axis as the rear bore 26. The front bore 27 engages the rear end of a wire guide 28 fitted in the barrel part of the gun. A part of the member 25 adjacent to the bore 27 is provided with a slit 30 dividing said part into an upper and a lower portion adapted to be urged towards each other by a clamping screw 32 so as to exert a clamping pressure upon the guide tube 28. Similarly, the part of the member 25 adjacent to the bore 26 is provided with a slit 29 and a clamping screw 31 in order to grip the sleeve 4 securely. The side wall of the bore 43 of the gun body is provided with an annular groove 33 serving to receive the compressed air emerging through the holes 5 of the sleeve 4. The annular groove 33 is connected to a conduit 34 in the gun body through which the compressed air is conducted to the motor via a control valve operated by the lever 35.

The welding wire emerging from the opening 8 at the tip of the plug member is gripped between the wire advancing roll 24 and the backing roll and fed into the guide tube 28 through the bore of the nipple 38 fitted in the rear end of the said guide tube. The shielding gas enters the chamber 41 through the openings 7 and flows from said chamber into a conduit 36 provided between the guide tube 28 and the barrel part of the gun body.

It will be clear from the foregoing description that the wire guide, the shielding gas conduit, the compressed air conduit and the welding wire cable are all connected to the gun simply by inserting the connector plug member into the bore 43 of the gun and tightening the clamping screw 31.

As shown in FIG. 5, a plug-and-socket connector may be provided at the other (rear) end of the composite hose and welding current cable 1–3 too, in order to permit said composite hose and cable to be quickly connected to or disconnected from the sources of supply. The plug member of the connector shown comprises a metal sleeve 11 attached at its anterior extremity to the hose 2 and the cable 3. A bushing 12 fitted in the rear extremity of the sleeve 11 is provided with a tubular forward extension 12a into which the rear end of the flexible inner tube or hose 1 is fitted. The passage or space enclosed between the inner wall of the sleeve 11 and the outer walls of the members 12a and 1 is subdivided by the annular sealing member 20 into a front passage and a rear passage. The front passage communicates freely with the compressed air conduit provided between the outer hose 2 and the inner hose, while the rear passage communicates with the interior of the extension 12a and the hose 1 through holes 13 in the wall of said extension. The portions of the sleeve 11 confining said front and rear passages are provided with inlet holes 23 and 10, respectively. A nipple 14 fitted into the bushing 12 has a bore lined with a wire spiral 15 of wear-resistant material, e.g. Phosphor bronze or beryllium bronze, said wire spiral serving both to take up the wear caused by the passage of the welding wire into the hose 1 through said bore and to form a substantially gas-tight seal between the bore and the welding wire to prevent appreciable loss of shielding gas. The anterior end of the wire spiral 15 extends into the hose 1 and may, if desired, extend the whole length of the hose 1 in order to protect it from wear.

The socket member 16 of the connector has a cylindrical bore adapted to receive the sleeve 11 of the plug member. The cylindrical bore is provided with two annular grooves 21, 22 facing, respectively, the holes 10 and 23 provided in the sleeve 11. Shielding gas is discharged into the groove 21 from a source of supply through suitable conduits including connecting member 19, while compressed air is discharged into the groove 22 from a source of supply through suitable conduits including connecting member 18. The contact clamp 17 is adapted to be connected to one terminal of a source of current and to grip the metal sleeve 11 in order to transmit the welding current to the same and also to secure the sleeve against axial displacement in the socket member.

While the invention has been described above with reference to a particular embodiment in which a compressed-air hose, a hose-shaped welding current cable and a flexible inner hose or tube are disposed within each other, it is to be understood that the invention is not limited to said embodiment nor to any other specific details illustrated and described except as may be necessitated by the appended claims.

I claim:

1. Apparatus for gas-shielded consumable-electrode arc welding comprising a welding gun and flexible means for the conveyance to the welding gun of all of the welding media required for its operation, said welding gun comprising a wire feeding mechanism, a compressed-air driven motor for operating said mechanism, and a gun housing enclosing said wire feeding mechanism, and said flexible means comprising a flexible welding current cable, a flexible guide for the welding wire, a flexible conduit for the shielding gas, and a flexible conduit for the compressed air, said flexible means having fitted at one end thereof a substantially cylindrical connector plug electrically connected to the flexible welding current cable and having outlet ports for the welding wire, the shielding gas and the compressed air, said gun being equipped at its rear end with a connector socket adapted to receive said connector plug.

2. Apparatus as claimed in claim 1, in which the connector socket is integral with said gun housing.

3. Apparatus as claimed in claim 1 which further comprises a second plug-and-socket connector adapted to transmit the various working media to the flexible means at the end remote from the welding gun, so that the flexible means and the connector members attached to each end of said flexible means form an easily detachable unit.

4. Apparatus as claimed in claim 1 which further comprises a contact clamp provided in the connector socket and adapted to grip the connector plug, whereby an adequate contact pressure is obtained for the transmission of the welding current and the connector plug is held securely in the connector socket.

5. Apparatus as claimed in claim 1 in which the plug member of the connector comprises a metal sleeve connected at its rear extremity to the flexible welding current cable, and a tubular member disposed within said sleeve so as to provide an inner passage within said tubular member and an outer passage between said sleeve and said tubular member, said inner passage being connected at its rear extremity to the flexible guide for the welding wire and the flexible conduit for the shielding gas and being provided at its front extremity with an opening or openings for the discharge of the wire and the shielding gas, said outer passage being connected at its rear extremity to a flexible compressed-gas conduit and being adapted to discharge the compressed gas through a hole or holes in the wall of the metal sleeve, sealing means being provided between the sleeve and the tubular member at a point between said hole or holes and the anterior end of the sleeve, and in which the welding gun has a body or housing having at its rear end a bore extending forwards to a chamber within said body or housing, said bore being adapted to accommodate the sleeve of the plug member so as to allow the welding wire and the shielding gas to be discharged into said chamber from the opening or openings at the front end of the inner passage of said plug, said body or housing being also provided with a compressed-gas conduit connecting the motor to a compressed-gas inlet port provided in the side wall of said bore so as to receive the compressed air discharged from the hole or holes in the wall of the metal sleeve, welding current transmitting means disposed within said body comprising a contact clamp adapted to grip the front extremity of the metal sleeve.

6. Apparatus as claimed in claim 3, characterized in that the plug member of said second plug-and-socket connector comprises a metal sleeve connected at its anterior end to the flexible welding current cable, tubular means disposed within said sleeve so as to provide an inner passage within said tubular means and an outer passage between said sleeve and said tubular means, sealing means disposed between the sleeve and the tubular means so as to subdivide said outer passage into a front passage and a rear passage, said front passage being connected to a flexible compressed-air conduit and being provided with a compressed-gas inlet hole or holes in the wall of the metal sleeve, said rear passage being provided with a shielding gas inlet hole or holes in the wall of the metal sleeve and with shielding gas outlet holes in the wall of the tubular means, said inner passage being connected at its anterior end to the flexible gas conduit and electrode guide and having at its rear end a constricted opening to allow the passage of the welding wire therethrough, and further characterized in that the socket member is provided with a bore adapted to accommodate the sleeve of the plug member, a first port arranged in the wall of said bore so as to communicate with the shielding gas inlet hole or holes of the plug member, a second port arranged in the wall of said bore so as to communicate with the compressed-gas inlet hole or holes of the plug member, means for connecting said ports to a source of shielding gas and a source of compressed gas, respectively, and a contact clamp adapted to be connected to one terminal of a source of welding current and to grip the metal sleeve to transmit the welding current to said sleeve and to hold the same against axial displacement in the socket member.

References Cited by the Examiner

UNITED STATES PATENTS

| | | | |
|---|---|---|---|
| 1,731,502 | 10/29 | Paterson | 219—130 |
| 2,586,140 | 2/52 | Anderson | 219—130 |
| 2,795,689 | 6/57 | McNutt | 219—125 |
| 3,108,179 | 10/63 | Ulli | 219—130 |
| 3,112,392 | 11/63 | Orr et al. | 219—130 |

RICHARD M. WOOD, *Primary Examiner.*